Figure 1:
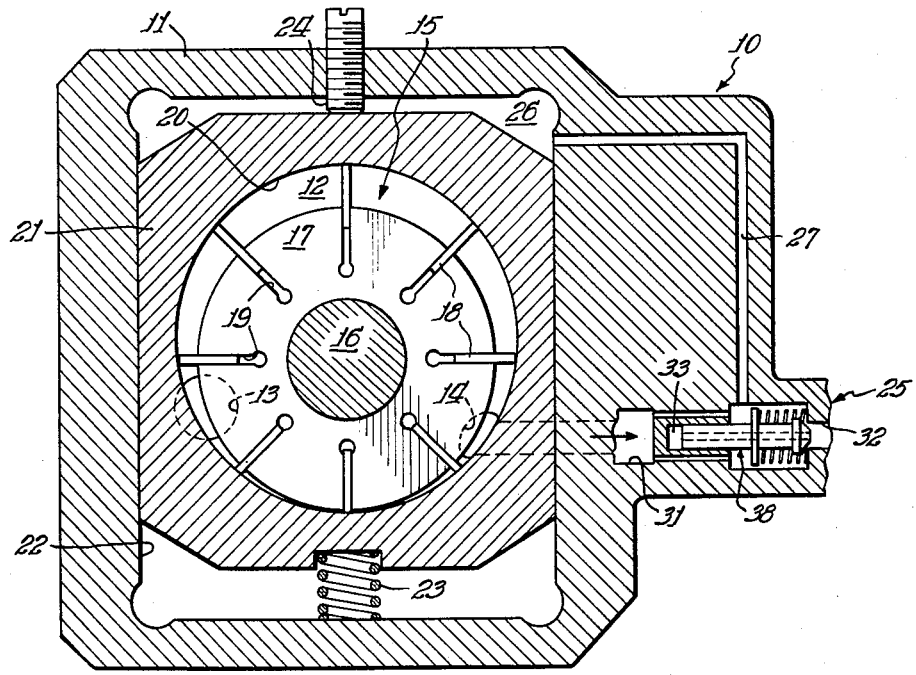

May 31, 1960     J. A. LAUCK     2,938,469

PUMP

Filed March 30, 1956

Inventor:
John A. Lauck
By: Joseph R Dwyer   Atty.

United States Patent Office 2,938,469
Patented May 31, 1960

2,938,469

PUMP

John A. Lauck, Shaker Heights, Ohio, assignor to Borg-Warner Corporation, Chicago, Ill., a corporation of Illinois Filed Mar. 30, 1956, Ser. No. 575,032

4 Claims. (Cl. 103—120)

The present invention relates to pumps and is particularly concerned with variable speed constant flow pumps capable of delivering the constant volume of fluid to a hydraulically actuated device or motor even though the pump impeller is driven at variable speeds.

There have been several types of prior pumps available which attempt to meet the normal requirements of operation and deliver a constant flow of fluid regardless of the speed at which the pump itself is driven but these pumps have fallen short of meeting these requirements of operation since they not only lack stability of operation under certain conditions, have been sluggish in certain instances thus causing an excessive drop in flow or in some instances too great a flow, have been uneconomical to operate and manufacture but, most important, have not acted as truly variable speed constant flow pumps.

In this connection, I have found that my invention overcomes all of the deficiencies of the prior pumps by providing a truly constant flow pump which will deliver a uniform rate of flow below a predetermined maximum rate over a wide variation in rotational speed of the pump impeller. For example, in an automotive vehicle transmission with my pump drivingly connected to the drive shaft of the engine, obviously the engine drive shaft will rotate the impeller shaft of the pump at variable speeds, yet my pump will only deliver a constant flow of fluid to the transmission, according to the requirements of the transmission at the time, regardless of the rotational speed of the drive shaft of the engine.

Accordingly it is a primary object of my invention to provide a constant flow variable speed pump which satisfactorily overcomes the limitations and deficiencies of the prior pumps and to improve this type of pump in various respects.

Another object of my invention is to provide a pump which will satisfactorily perform over a wide range of speeds yet deliver only a constant flow of fluid at a predetermined pressure and yet be responsive to the change in flow requirements made upon the pump at any given instant.

I propose to accomplish the above objects in one embodiment of my invention by providing in combination with a vane pump having a slidable block, the change of position of which effectively varies the pumping capacity of the pump, a flow restrictor valve assembly located in the discharge line of the pump in such a manner that any variation in inlet pressure (discharge pressure of the pump) to the flow restrictor valve assembly and any variation in back pressure, against outlet of the flow restrictor valve will vary the position of the sliding block. In other words the flow discharge capacity of my pump is determined by the requirement of any hydraulic pressure utilization device as reflected through a flow restrictor valve which predetermines the maximum amount of flow available to the hydraulic utilization device—a truly variable speed constant flow pump assembly.

Figure 2:
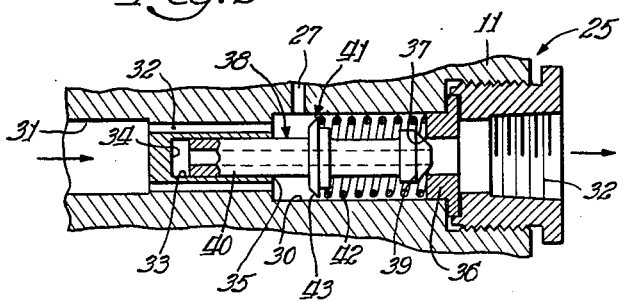

Other objects, features and advantages of my invention will be readily apparent from the following detailed description of a preferred embodiment of my invention taken in conjunction with the drawings forming a part thereof and wherein:

Figure 1 is an elevational, sectional view showing semi-schematically the pump constructed in accordance with the teachings of my invention; and Figure 2 is an enlarged, detail, cross-sectional view of the flow restrictor valve used forming a vane pump as shown in Figure 1.

Referring now to the drawings, there is shown in Figure 1 a vane-type pump indicated in its entirety by 10 having a housing 11 and provided with a centrally located pumping cavity 12. Inlet 13 and outlet 14, respectively, communicate with the pumping chamber 12 whereby on rotation of the pump impeller, indicated in its entirety as 15, fluid introduced into the chamber 12 from the inlet 13 is discharged under pressure through outlet 14. Impeller 15, adapted to be drivingly connected to any driving means (not shown), comprises a shaft 16 having a rotor 17 keyed or otherwise suitably affixed thereto. Radially extending blades or vanes 18 are suitably arranged in radially extending slots 19 provided in the rotor 17 and arranged to reciprocate within said slots in a known manner. The radially outer ends of blades 18 contact the surface or race 20 of the substantially rectangular sliding block 21 to convey fluid from the inlet 13 to the outlet 14. Obviously, race 20 could be a separate ring member of a material different than the sliding block 21, if desirable. Radially extending reciprocable vanes 18 are maintained against the race 20 during pumping operation by any suitable method such as by pressure communicated to the radially inner ends of the blades from the high pressure side of the pump or by a ring member eccentrically mounted about the shaft 15 and engaging the radially inner ends of the blades. Since the details of the impeller and its operation thereof are well-known to those skilled in the manufacture of pumps, further detailed explanation of the general features thereof is believed unnecessary.

Sliding block 21 is suitably arranged to slide within the rectangular cavity 22 formed in the housing 11 and as shown in the drawing is capable of movement in an upward and downward direction. A suitable compression means such as spring 23 having one end thereof disposed against the lower portion housing 11 and the other end disposed against the sliding block 21, normally biases the sliding block 21 toward its extreme upward position. A stop means 24 is threadably affixed to the housing 11 to prevent the block from moving upward beyond a selected or predetermined position. Obviously, the selection of the stop means and spring arrangement could be varied according to the requirements of operation of the pump.

Turning now to the pumping cavity 12, it can be seen that the axis or center of curvature of the race 20 and the axis of rotation of the shaft 16 are not concentric. Obviously the maximum capacity of the pump exists when the center of curvature or axis of the race 20 is the greatest distance from the axis of rotation of the shaft 16 whereby large amounts of fluid are transported under pressure out the outlet 14. Variation of position of the sliding block 21 will change the eccentricity relationship between the axis of rotation of shaft 16 and the axis of race 20 and therefore change the capacity of the pump. In other words when the sliding block 21 is in its maximum upward position the pump is operating at full displacement and when the sliding block is at any lower position the pump is operating at less than full capacity; the minimum capacity of the pump existing when the axis of race 20 is concentric with the axis of rotation of shaft 16. Obviously, by threadably adjusting the stop means 24 the maximum capacity of the pump can be determined. It can be seen, therefore, that the output of the pump is dependent upon two variables—the speed of rotation of the impeller 15 responsive to the speed of rotation of the driving means thereof and the capacity of the pumping cavity 12 as varied in accordance with the position of the sliding block 21.

The positioning of the sliding block 21 and its movement in a piston-like manner relative to the housing 11 and to the axis of rotation of the shaft 16 is accomplished by means of a flow restrictor valve assembly, designated in its entirety by numeral 25 and shown in the embodiment disclosed as an integral part of the housing 11, which is in fluid communication with the pump outlet 14 and fluid communication with pressure chamber 26, formed by the upper surface 27 of substantially rectangular sliding block 21 and the upper portion of the cavity 22 of the housing 11, by passage 27 connected with one end of chamber 26 and at the other end to the flow restrictor valve assembly 25.

Referring now in greater detail to Figure 2 of the drawings, flow restrictor valve assembly 25 operates to prevent the rate of flow of fluid under pressure to any pressure utilizing device or motor connected thereto from rising above a pre-determined value and to assure a constant flow of fluid to any such pressure utilization device regardless of any difference in the value of pressure at the inlet to the valve assembly caused by changes in rotational speed of the impeller 15 or position of the sliding block 21 as such rotational speed or position of the sliding block affect the flow of fluid through the valve assembly. As described in United States Patent No. 2,307,949 to M. J. Phillips valves of this type can be pressure balanced so that they are responsive only to changes in flow through the valve assembly as such flow affects the internal parts thereof.

Specifically, flow restrictor valve assembly 25 comprises an elongated valve chamber 30 formed in housing 11 and having valve inlet 31 in fluid communication with pump outlet 14 and a valve outlet 32 in fluid communication with a hydraulic utilization device or devices to be operated from pressure from the pump assembly. Valve chamber 30 is placed in communication with valve inlet 31 through a plurality of passages 32 (only two of which are shown) formed within said housing 11 radially outwardly of a centrally disposed cylindrical counterbore 33 having a closed end 34 and an opened end 35. At the opposite end of the chamber 30 from counterbore 33 there is provided a member 36 forming a valve seat 37 removably secured in the housing 11.

A slidable valve proper 38 is slidably received in said valve chamber 30 for piston-like movement therein and comprises an elongated stem having at one end a general frusto-conical valve means 39 engageable with valve seat 37 and terminating at the other end in a piston-like portion 40 received in slidable relationship in the counterbore 33. A flange-like member 41 is formed intermediate the ends of the valve proper 38 in predetermined spaced relationship with the surrounding inner peripheral wall of valve chamber 30 thus providing a space for the flow of fluid between the walls of this chamber and the peripheral portions of the flange member 41. Flow of fluid through this confined space exerts coaxial pressure on the flange member 41 urging the frusto-conical valve means 39 into engagement with the valve seat 37 with a force proportional to the rate of flow past the flange member 41. As in the usual flow restrictor valve assembly constructed in accordance with the teachings of the aforementioned Phillips patent, the entire assembly may be rendered responsive solely to the force resulting from this flow of fluid past the flange member 41 by properly balancing the various areas on the slidable valve proper 38 subject to pressure and flow and there is also provided in the chamber 30 a coil compression spring 42, one end of which rests against the valve seat member 36 and the other end of which rests against the flange member 41 so as to react against the force tending to move the frusto-conical valve means 39 toward valve seat 37. The actual dimensions of the areas of valve proper 38 to provide proper and desired balance may be readily computed and varied according to the desired results, and the compressability of spring 42 may be chosen with reference to the rate of flow desired.

Further details of the valve assembly are found in the aforementioned Phillips patent and thus further discussion herein is deemed unnecessary.

Thus, any fluid, entering the valve inlet 31 as discharged from pump outlet 14, and flowing past the flange member 41 and between the inner periphery of the valve chamber 30, will provide a force acting against the flange member 41 and in turn against the compression spring member 42 tending to urge the frusto-conical valve means 39 against the valve seat 37. Accordingly, any increase in flow or any decrease in flow as reflected in the increase or decrease in back pressure in the area of chamber 30 formed in part by the surface 43 facing the inlet 31 caused in part by the increase or decrease in the amount of fluid attempting to flow past the flange member 41 as reflected in an increase or decrease in pressure in valve inlet 31 or valve outlet 32 will be reflected in the pressure chamber 26 to move the sliding block 21 of the pump assembly 10 upward or downward in a piston-like manner. This movement obviously changes the flow discharge of the pump as heretofore described. Thus, a pressure increase in the valve chamber 30 as by the decrease in demand made upon the pump assembly 10 or by the increase in the rotational speed of the impeller 15 will cause the sliding block 21 to move downwardly against the opposition of spring 23 and reduce the flow discharge of the pump. Similarly, a decrease of pressure in the valve chamber 30 as by an increase in demand for fluid made upon the pump assembly or upon a decrease of the rotational speed of the impeller will be reflected as a decrease in pressure in chamber 26 which will decrease the force reacting against spring 23 which in turn will cause the sliding block 21 to move upwardly increasing the flow output of the pump.

It will thus appear from the above description that I have provided an improved constant delivery variable speed pump assembly capable of delivering a constant flow of fluid and which will overcome the deficiencies of prior pumps.

Wherein the various parts of my invention have been referred to as located in a right or left position, or in an upper or lower position, it will be understood that this is done solely for the purpose of facilitating description and that such references relate only to the relative position of such parts as shown in the accompanying drawings, and while one preferred embodiment of my invention has been specifically disclosed it will be understood that my invention is not so limited, and my invention is to be given its broadest possible interpretation within the terms of the following claims.

I claim:

1. A constant flow pump having a housing with an inlet and an outlet and provided with a pumping chamber; a rotatable impeller disposed in said chamber whereby upon rotation thereof fluid in said inlet is discharged under pressure out said outlet; means comprising a valve chamber disposed within said outlet, a slidable valve member disposed in said valve chamber, said valve member being hydraulically balanced and including means cooperating with said valve chamber so as to be responsive only to flow through said valve chamber and around said valve member for restricting the flow of fluid discharged by said impeller, said means cooperating with said valve chamber providing upstream and downstream pressure chambers in said valve chamber; and means in communication only with said upstream pressure chamber for varying the pumping capacity of said pumping chamber.

2. A constant flow pump having a housing with an inlet and an outlet and provided with a pumping chamber; a rotatable impeller disposed in said chamber whereby upon rotation thereof fluid in said inlet is discharged under pressure out said outlet; means comprising a valve chamber disposed within said outlet, a slidable valve member disposed in said valve chamber, said valve member being hydraulically balanced and including means cooperating with said valve chamber so as to be responsive only to flow through said valve chamber and around said valve member for restricting the flow of fluid discharged by said impeller, said means cooperating with said valve chamber providing upstream and downstream pressure chambers in said valve chamber; and means comprising a movable block in communication only with said upstream pressure chamber for varying the pumping capacity of said pumping chamber.

3. A constant flow pump having a housing with an inlet and an outlet and further having a movable block provided with a pumping chamber; a rotatable impeller disposed in said chamber whereby upon rotation thereof fluid in said inlet is discharged under pressure out said outlet; means comprising a valve chamber disposed within said outlet, a slidable valve member disposed in said valve chamber, said valve member being hydraulically balanced and including means cooperating with said valve chamber so as to be responsive only to flow through said valve chamber and around said valve member for restricting the flow of fluid discharged by said impeller, and means cooperating with said valve chamber providing upstream and downstream pressure chambers in said valve chamber; and means comprising a portion of said movable block in communication only with said upstream pressure chamber for varying the pumping capacity of said pumping chamber.

4. A constant flow pump having a housing with an inlet and an outlet and further having a movable block provided with a pumping chamber; a rotatable impeller disposed in said chamber whereby upon rotation thereof fluid in said inlet is discharged under pressure out said outlet; means comprising a valve chamber disposed within said outlet, a slidable valve member disposed in said valve chamber, said valve member being hydraulically balanced and including means cooperating with said valve chamber so as to be responsive only to flow through said valve chamber and around said valve member for restricting the flow of fluid discharged by said impeller, and means cooperating with said valve chamber providing upstream and downstream pressure chambers in said valve chamber; resilient means urging said movable block to a position whereby said pump is pumping at maximum capacity; and means comprising a portion of said movable block in fluid communication only with said upstream pressure chamber for varying the pumping capacity of said pumping chamber.

References Cited in the file of this patent
UNITED STATES PATENTS

| | | |
|---|---|---|
| 2,600,632 | French | June 17, 1952 |
| 2,600,633 | French | June 17, 1952 |
| 2,606,503 | Shaw | Aug. 12, 1952 |
| 2,716,946 | Hardy | Sept. 6, 1955 |
| 2,742,862 | Banker | Apr. 24, 1956 |
| 2,768,585 | Hardy | Oct. 30, 1956 |
| 2,775,946 | Hufferd | Jan. 1, 1957 |